March 5, 1968  G. E. HOERNES  3,372,268
PULSE GENERATOR

Filed Oct. 1, 1965  3 Sheets-Sheet 1

INVENTOR
GERHARD E. HOERNES

BY *Owen Lamb*

AGENT

United States Patent Office 3,372,268
Patented Mar. 5, 1968

3,372,268
PULSE GENERATOR
Gerhard Emmerich Hoernes, Poughkeepsie, N.Y., assignor to International Business Machines Corporation, Armonk, N.Y., a corporation of New York
Filed Oct. 1, 1965, Ser. No. 491,993
4 Claims. (Cl. 235—151.11)

ABSTRACT OF THE DISCLOSURE

A positioning mechanism which responds to pulses supplied on a first and a second axis such that a movable element is moved along a slope. A pulse generator repetitively generates pulses on the $x$ axis and generates a pulse on the $y$ axis only when the pulse on the $y$ axis will not cause the mechanism to be moved above the slope. An interpolator in the pulse generator subtracts the distance remaining to be moved in the $y$ direction from the distance to be moved in the $x$ direction repetitively until the result obtained is equal to or less than zero at which time a $y$ pulse is emitted. For each subtraction, an $x$ pulse is emitted. When the $y$ pulse is emitted, the distance now remaining to be moved in the $x$ and $y$ directions is utilized in the calculations and the subtractions are performed again. This process continues until the distances in both directions are reduced to zero.

---

This invention relates to pulse generators and more particularly to pulse generators which generate a series of pulses for use in the control of pulse-driven positioning mechanisms.

Numerically controlled machine tools are positioned by a mechanism which responds to pulses supplied to it. Each pulse represents a small increment of movement in the order of fractions of an inch. The number of pulses supplied to the tool in a particular axis of movement determines the distance which the tool moves in that direction.

Numerically controlled contouring machines are used to machine shapes of two or three dimensions, involving the $x$ and $y$ and possibly the $z$ axes of movement. The pulses supplied to each axis are generated by a pulse generator called an interpolation unit.

Position data are supplied to the interpolation unit from a data source which may be a paper tape or a computer memory. The function of the interpolation unit is to generate a series of pulses on each axis of movement. The pulses energize the positioning mechanism which moves the tool or table bed to the desired location. The number of pulses generated at each axis is proportional to the distance it is desired to move the table on that axis and the rate at which the pulses are supplied is proportional to the rate of movement of the table.

One problem encountered in interpolation units is that of ensuring that pulses generated on one axis which is to move a shorter distance than another axis are equally spaced so that the motion is continuous and follows a straight line to the desired position. To accomplish this, all the pulses generated on the shorter axis must be spread out so that they occur over the same time interval as the pulses generated in the longer axis.

If a short cut is to be made, the interpolation unit has to operate at a very high speed to produce a reasonable pulse rate at the output. Thus, the number of calculations employed to ensure the proper pulse train limits the effectiveness of the system.

It is a paramount object of this invention to provide an apparatus for generating pulse trains having a different number of pulses in each train in which the pulses in the shorter train are evenly spaced and are generated over the same period of time as the pulses in the longer train.

It is a further object of this invention to provide an interpolation unit for a numerical control machine in which arithmetic operations are performed rapidly.

It is also an object of this invention to provide an interpolation unit which utilizes the actual position of a moving unit in a numerical control machine to modify the generated pulse train which causes the moving unit to change its position.

The above objects are accomplished in accordance with the invention by providing a system for moving a pulse driven positioning mechanism along a slope which always generates a pulse on one axis and which generates a pulse on a second axis only when the pulse on the second axis will not cause the mechanism to be moved above the slope.

In accordance with one aspect of the invention, an interpolator subtracts the distance remaining to be moved in the $y$ direction from the distance to be moved in the $x$ direction repetitively until the result obtained is equal to or less than zero, at which time a $y$ pulse is emitted. For each subtraction, an $x$ pulse is emitted. When the $y$ pulse is emitted, the distance now remaining to be moved in the $x$ and $y$ directions is utilized in the calculations, and subtractions are performed again. This process continues until the distances in both directions are reduced to zero.

The invention has the advantage that for short cuts, the arithmetic unit does not have to operate at a very high speed to produce a reasonable pulse rate at the output.

In this interpolation unit, the axis which has the larger travel always has a pulse generated for each calculation. This means that the arithmetic operations are completed quickly.

A further advantage is that the control system operates in such a manner that the actual position of the table or tool, rather than the calculated position, may be used to modify the pulse train. Therefore, if the movement in one of the axes falls behind, the pulse train in that axis increases in rate, thus causing the machine to overcome the drag.

The foregoing and other objects, features and advantages of the invention will be apparent from the following more particular description of preferred embodiments of the invention, as illustrated in the accompanying drawings.

Figure 1:
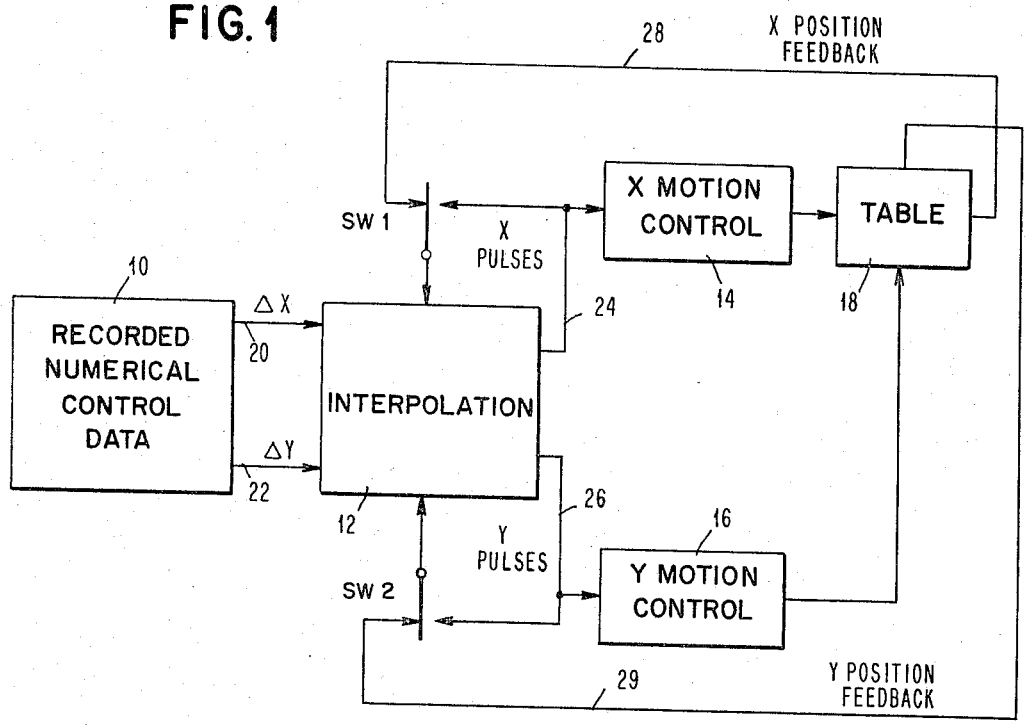
FIG. 1 is a block schematic diagram of a numerical control system of the type in which the invention may be embodied.

Referring now to FIG. 1, a numerical control system is comprised of a source of recorded numerical control data 10 which may be a computer memory or a paper tape; an interpolation unit 12; $x$-motion control apparatus 14; $y$-motion control apparatus 16; and a table or machine tool 18 which is moved to a position determined by the numerical control data.

The apparatus 10 supplies positioning information for the $x$ axis along output line 20 and positioning information for the $y$ axis along output line 22 to the interpolation unit 12. The interpolation unit generates pulses for the $x$ axis on output lyine 24 and pulses for the $y$ axis on output line 26. These pulses energize the $x$-motion control and the $y$-motion control respectively, which convert the pulses to an analog signal which moves the table an incremental distance for each pulse received. Pulses representing the actual position of the table are fed back on $x$-position feedback line 28 and $y$ position feedback line 29 to the interpolation unit which utilizes this data to modify upwardly or downward the number of pulses generated, depending upon whether the movement has been too little or too much in the desired direction. Instead of entering the feedback information into the interpolation unit 12, the $x$ pulses and $y$ pulses may be utilized to modify calculations by moving switches SW1 and SW2 to the positions opposite to what is shown in FIG. 1.

The present invention is concerned with the apparatus contained within the interpolation unit 12 which generates the $x$ and $y$ pulses. The invention will be described first with respect to FIG. 3 which shows the arithmetic steps which must be performed by the interpolation unit to produce the desired pulse trains, in accordance with the invention.

$\Delta x$ and $\Delta y$ represent the actual distance to be moved on the $x$ axis and the $y$ axis respectively. These distances are obtained from the differences between the actual position of the positioning mechanism and the position to which it is desired to move the mechanism.

Figure 3:
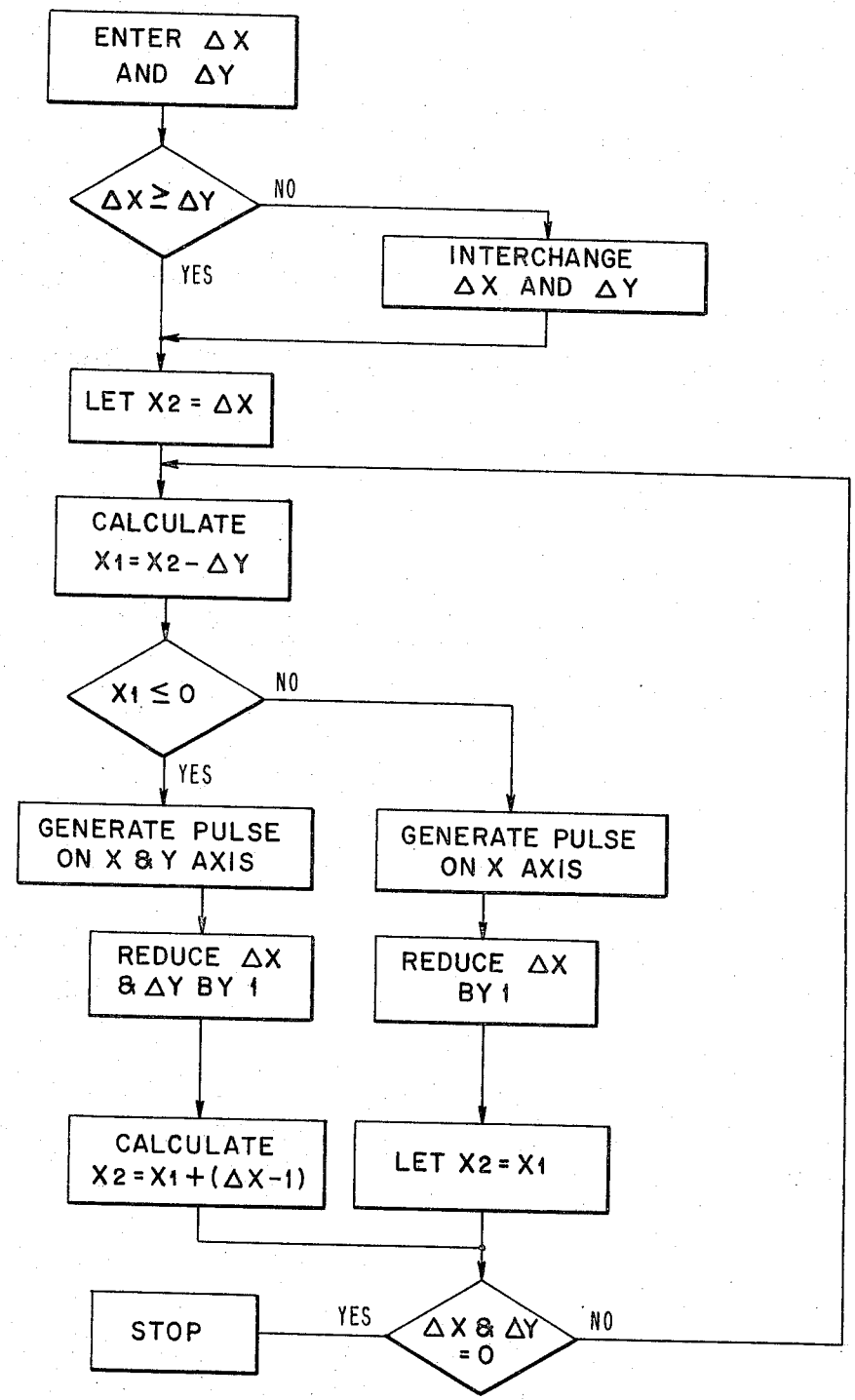
FIG. 3 is a flow chart illustrating the sequence of operations performed by the logic shown in FIG. 4.

Referring now to FIG. 3, the arithmetic calculations performed by the invention are as follows: First, the values of $\Delta x$ and $\Delta y$ are entered into the interpolation unit. A comparison is made by logic (not shown) to determine if $\Delta x$ is greater than or equal to $\Delta y$. If not, then $\Delta x$ and $\Delta y$ and the $x$ and $y$ pulses are interchanged. Assume that $\Delta x$ is greater than $\Delta y$. On the next step, $x_2$ is set equal to $\Delta x$. Next, $x_1$, which is $x_2 - \Delta y$, is calculated. In the next step, $x_1$ is examined to see if it is less than or equal to zero. Assuming that $x_1$ is less than zero, a pulse is generated on the $x$ and $y$ axes. $\Delta x$ and $\Delta y$ are reduced by one. $x_2$ is calculated by adding $x_1$ to the new value of $\Delta x$. $\Delta x$ and $\Delta y$ are then tested to see if they are equal to zero. If not, then the operations are continued. $x_1$ is calculated by subtracting $\Delta y$ and $x_2$. Assume now that $x_1$ is greater than zero, in which event no pulse is generated on the $y$ axis. However, a pulse is generated on the $x$ axis as illustrated by the righthand path in the flow chart of FIG. 3. $\Delta y$ is not reduced by one; however, $\Delta x$ is. The next step sets $x_2$ equal to $x_1$. Next $\Delta x$ and $\Delta y$ are tested to see if they are equal to zero. If not, then the process is continued. However, when $\Delta x$ and $\Delta y$ are equal to zero, the operation is stopped because the tool has reached the desired position.

Given any values for $\Delta x$ and $\Delta y$, these arithmetic operations produce pulses on the $y$ axis which are evenly spaced over the duration of pulses produced on the $x$ axis. The table below demonstrates this by calculating $x$ and $y$ pulses for $\Delta x = 18$, and $\Delta y = 6$. The movement of a machine tool or table in response to these pulse trains is shown by the solid line in FIG. 2.

TABLE

| $\Delta x$ | $\Delta y$ | $x_2 - \Delta y = x_1$ | $x_p$ | $y_p$ |
|---|---|---|---|---|
| 18 | 6 | 18−6=12 | 1 | 0 |
| 17 | 6 | 12−6=6 | 1 | 0 |
| 16 | 6 | 6−6=0 | 1 | 1 |
| 15 | 5 | 15−5=10 | 1 | 0 |
| 14 | 5 | 10−5=5 | 1 | 0 |
| 13 | 5 | 5−5=0 | 1 | 1 |
| 12 | 4 | 12−4=8 | 1 | 0 |
| 11 | 4 | 8−4=4 | 1 | 0 |
| 10 | 4 | 4−4=0 | 1 | 1 |
| 9 | 3 | 9−3=6 | 1 | 0 |
| 8 | 3 | 6−3=3 | 1 | 0 |
| 7 | 3 | 3−3=0 | 1 | 1 |
| 6 | 2 | 6−2=4 | 1 | 0 |
| 5 | 2 | 4−2=2 | 1 | 0 |
| 4 | 2 | 2−2=0 | 1 | 1 |
| 3 | 1 | 3−1=2 | 1 | 0 |
| 2 | 1 | 2−1=1 | 1 | 0 |
| 1 | 1 | 1−1=0 | 1 | 1 |
| 0 | 0 | STOP | 0 | 0 |

Referring to the table, $\Delta x$ and $\Delta y$ are initially equal to 18 and 6 respectively. The first step is to let $x_2$ equal $\Delta x$. Therefore, $x_2$ is equal to 18. $x_1$ is calculated by subtracting $\Delta y$ from $x_2$, leaving a remainder of 12. A pulse is generated on the $x$ axis and no pulse is generated on the $y$ axis. $\Delta x$ is reduced by one to therefore become 17. $\Delta y$ is not reduced and therefore remains 6. Assuming, however, that the machine table may not have moved, this information may be reinserted into the interpolation unit, in which event $\Delta x$ remains equal to 18 and the calculations would continue. Assume that the machine table does moves one increment.

The second step is to calculate $x_2$, which is set equal to $x_1$ and therefore is 12. $x_1$ is recalculated by subtracting $\Delta y$ from the new value for $x_2$, leaving a new difference of 6. An $x$ pulse is generated. $x_1$ is greater than zero; therefore, no $y$ pulse is put out on the $y$ axis. $\Delta x$ is reduced by 1 to 16 and $\Delta y$ is left unchanged.

Again, $x_2$ is calculated by setting $x_2$ equal to $x_1$. A new value of $x_1$ is calculated by subtracting $\Delta y$ from the new value of $x_2$, leaving a remainder of zero. $x_1$ is now equal to zero, and a pulse is put out on both the $x$ and the $y$ axes. $\Delta x$ and $\Delta y$ are both reduced by one, leaving the values 15 and 5 respectively.

$x_2$ is calculated by adding $x_1$ to the new value of $\Delta x$, leaving a sum of 15 for $x_2$. $x_1$ is calculated by subtracting $\Delta y$ from $x_2$, leaving a difference of 10. Ten is greater than zero, and therefore no pulse is generated on the $y$ axis, but a pulse is generated on the $x$ axis. $\Delta x$ is reduced by one; however, $\Delta y$ is left unchanged. These repetitive steps continue until $\Delta x$ and $\Delta y$ equal zero. The $y$ pulses are generated in an evenly spaced manner throughout all of the 18 pulses occurring on the $x$ axis and for each calculation, a pulse is generated on the $x$ axis.

Figure 4:
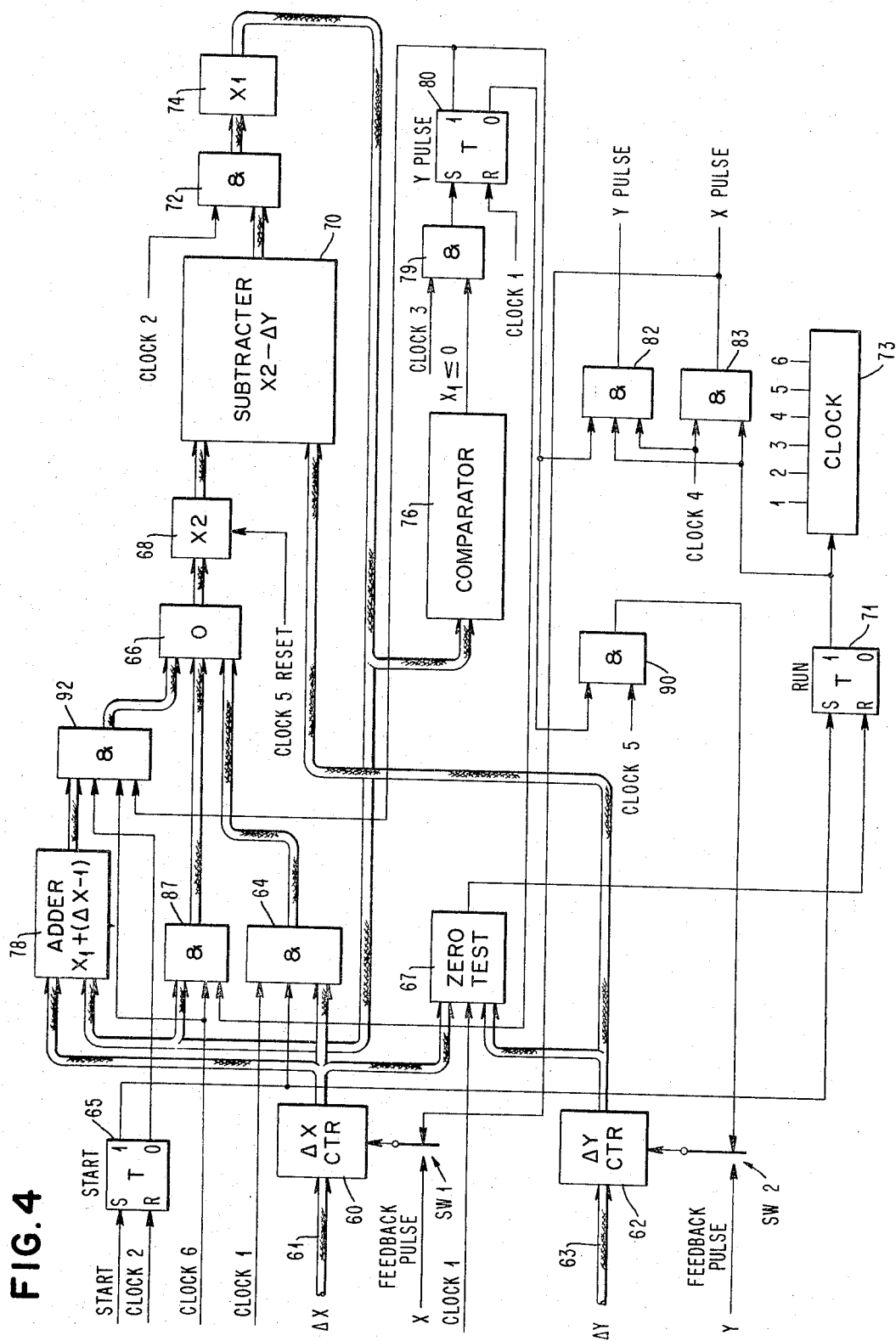

Referring now to FIG. 4, an interpolation unit constructed in accordance with the invention is shown. A $\Delta x$ counter 60, which is of the countdown type, is provided for the $x$ direction. A similar counter 62 is provided for the $y$ direction. The output of the $\Delta x$ counter is gated through an AND circuit 64 via an OR circuit 66 to $x_2$ register 68. The output of the $x_2$ register 68 is combined in a subtractor 70 with the output of the $\Delta y$ counter. The output of subtractor 70 is gated through an AND circuit 72 to an $x_1$ register 74. The output of the $x_1$ register drives a comparator 76 and an adder 78. The output of the comparator 76 drives an AND circuit 79, the output of which is connected to the set input of a $y$ pulse trigger 80. The one output of the trigger 80 drives AND circuits 82, 90, 92 and the zero side of the trigger drives an AND circuit 87.

Initially, the recorded numerical data are stored in the $\Delta x$ counter 60 via $\Delta x$ bus 61 and into the $\Delta y$ counter via the $\Delta y$ bus 63. A control signal on the start input 65 turns on the start trigger, the output of which energizes AND circuit 64 and turns on run trigger 71. Run trigger 71 starts a sequence clock 73. At clock 1 time in the clock cycle indicated by "clock 1" line, AND circuit 64 is energized, transferring the contents of $\Delta x$ counter to the $x_2$ register 68. At this same time, the contents of the $\Delta y$ counter are tested in zero test logic 67. If both $\Delta x$ and $\Delta y$ are zero, the run trigger 71 is turned off, thus stopping the operation. Assume $\Delta x$ and $\Delta y$ are not zero.

At clock 2 time, the contents of subtractor 70 (which subtracts the contents of $x_2$ register 68 and the contents of $\Delta y$ counter 62) are gated via AND circuit 72 to $x_1$ register 74. Also, start trigger 65 is reset at clock 2 time. If the output of the comparator 76 indicates that $x_1$ is less than or equal to zero, the output of the AND 78 is energized at clock 3 time. A pulse is emitted from AND circuit 78 which turns on the $y$ pulse trigger 80.

Assume that $\Delta x$ is greater than $\Delta y$. If this is true, then the $y$ pulse trigger remains off, and at clock 4 time, only an $x$ pulse is generated from the output of AND circuit 83. The $x$ pulse reduces the contents of the $\Delta x$ counter 60 by one. At clock 5 time, $x_2$ register 68 is reset, and at clock 6 time, the contents of $x_1$ register 74 are gated via AND circuit 87 through OR circuit 66 to $x_2$ register 68.

The clock continues to run starting again at clock 1 time. Since the start trigger 65 is now reset, only a zero test occurs at clock 1 time, and $x_1$ register 74 is reset.

At clock 2 time, the output of subtractor 70, which contains the results of the subtraction of $x_2 - \Delta y$ is transferred to $x_1$ register 74. The contents of $x_1$ register are compared in comparator 76. Assuming now that $x_1$ is equal to or less than zero, the output from the comparator is energized. At clock 3 time, the $y$ pulse trigger is turned on by the coincidence of the output of comparator 76 and clock 3 time in AND circuit 78. At clock 4 time, a $y$ pulse and an $x$ pulse are generated by the coincidence of clock 4 in AND circuits 82 and 83 respectively.

The $x$ pulse is fed back to reduce the $\Delta x$ counter by one. At clock 5 time, the coincidence of an output from the ON side of $y$ pulse trigger 80 and clock 5 at AND circuit 90 causes an output therefrom to reduce the contents of $\Delta y$ counter by one. At clock 6 time, the output of adder 78 (which adds $x_1 + \Delta x$) is gated by AND circuit 92 to $x_2$ register 68. The cycle is repeated until $\Delta x$ and $\Delta y$ are reduced to zero. When this occurs, an output from zero test circuit 67 resets the run latch 71, thus stopping clock 73.

Figure 2:
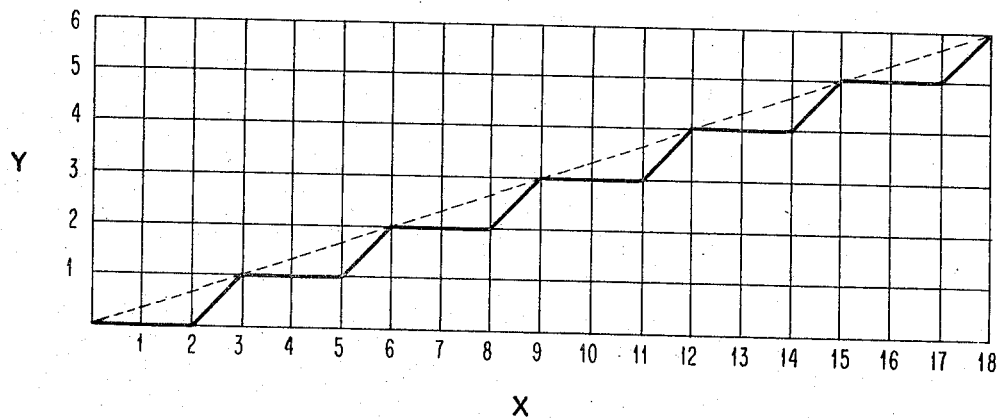
FIG. 2 is a graphic representation of the path of movement of a machine tool controlled in accordance with the invention.

The graph in FIG. 2 shows by the dotted line the desired path which the machine tool should follow to move to the position 18, 6. The actual path moved by this interpolation unit is shown by the solid line in the graph.

Reducing the $\Delta x$ and $\Delta y$ counters by one after each $x$ and $y$ pulse assumes that the positioning mechanism moved one increment. If the positioning mechanism did not move far enough, $\Delta x$ and $\Delta y$ may be reduced to zero before the positioning mechanism has actually moved to the desired position. This condition is corrected when the actual feedback position pulses are used in the calculations performed by the interpolation unit instead of the position obtained by reducing $\Delta x$ and $\Delta y$ counters by 1 by the $x$ and $y$ pulses. Circuitry for accomplishing this is put into action by moving switches SW1 and SW2 to positions opposite to the positions shown in FIG. 4. In this configurations, pulses generated in response to actual movement of the table are used to reduce the values of $\Delta x$ and $\Delta y$.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an apparatus for moving a moveable element from one point to another where the distance between two points is representable by the vector sum of at least a first direction of movement and a second direction of movement equal to or less than the first direction of movement;
   a subtractor which, when energized, initially subtracts a manifestation of the distance remaining to be moved in the second direction from a manifestation of the distance remaining to be moved in the first direction, then subtracts the manifestation of the distance remaining to be moved in the second direction from the result of said initial subtraction to provide a new result and which thereafter repetitively subtracts the manifestation of the distance remaining to be moved in the second direction from each successively calculated result;
   means operable upon each successive subtraction for moving said moveable element one increment in the first direction of movement;
   and means operable when the result of a subtraction is equal to or less than zero for de-energizing said subtractor, for moving said moveable element one increment in the second direction of movement and for thereafter again energizing said subtractor.

2. A pulse generator for generating pulses in separate pulse trains, which pulses cause a mechanism to move in $x$ and $y$ axes in accordance with the number of pulses generated in each axis, comprising:
   first storage means for storing a manifestation of the distance to be moved on the $x$ axis, said means including means responsive to an indication that the mechanism has moved for reducing the stored manifestation proportionately;
   second storage means for storing a manifestation of the distance to be moved on the $y$ axis, said means including means responsive to an indication that the mechanism has moved for reducing the stored manifestation proportionately;
   $x_2$ storage means for storing an intermediate value $x_2$ including means for initially storing therein a manifestation of the distance to be moved on the $x$ axis;
   subtraction means for calculating and storing an intermediate value $x_1$ such that $x_1$ equals the difference between the intermediate value $x_2$ and the manifestation of the distance to be moved on the $y$ axis;
   comparison means responsive to said subtraction means for determining if $x_1$ is less than or equal to zero;
   means operative when said comparison means indicates that $x_1$ is less than or equal to zero for generating pulses on both the $x$ and $y$ axes, which pulses cause the mechanism to move one increment in both $x$ and $y$ axes; and for calculating a new value of $x_2$ which value is the sum of $x_1$ plus the manifestation of the distance remaining to be moved on the $x$ axis; and
   means operative when said comparison means indicates that $x_1$ is greater than zero, for generating a pulse only on the $x$ axis; and for storing the value of $x_1$ in said $x_2$ storage means.

3. A pulse generator for generating pulses in separate pulse trains which pulses cause a mechanism to move in $x$ and $y$ axes in accordance with the number of pulses in each axis, comprising:
   means for storing a manifestation of the distance to be moved on the $x$ axis;
   means for storing a manifestation of the distance to be moved on the $y$ axis;
   $x_2$ storage means for storing an intermediate value $x_2$ including means for initially storing therein a manifestation of the distance to be moved on the $x$ axis;
   subtraction means for calculating and storing an intermediate value $x_1$ such that $x_1$ equals the difference between the intermediate value $x_2$ and the manifestation of the distance to be moved on the $y$ axis;
   comparison means responsive to said subtraction means for determining if $x_1$ is less than or equal to zero;
   means operative when said comparison means indicates that $x_1$ is less than or equal to zero for generating pulses on both the $x$ and $y$ axes; for reducing the stored manifestations of the distances to be moved in each axis by one increment; and for calculating a new value of $x_2$ which value is the sum of $x_1$ plus the reduced value of the distance to be moved on the $x$ axis; and
   means operative when said comparison means indicates that $x_1$ is greater than zero for generating a pulse only on the $x$ axis; for reducing the distance to be moved on the $x$ axis by one increment; and for storing the value of $x_1$ in said $x_2$ storage means.

4. In a pulse generator for generating a series of pulses for use in the control of pulse driven positioning mechanisms:
   first means for storing a manifestation of the distance remaining to be moved on a first axis of said mechanism;
   second means for storing a manifestation of the distance remaining to be moved on a second axis of said mechanism;
   an arithmetic unit having the capability of adding and subtracting and of storing an accumulated number therein;
   means for initially storing in said arithmetic unit a manifestation of a distance to be moved on the first axis as said accumulated number;
   said arithmetic unit including means for adding the manifestation of the distance remaining to be moved on the first axis stored in said first means to the value of said accumulated number upon the condition that said accumulated number is equal to or less than zero, and for subtracting the distance remaining to be moved on the second axis stored in said second means from the value of said accumulated number upon the condition that said accumulated number is greater than zero; and means operable to store the result of said addition and subtraction as said accumulated number.

References Cited

UNITED STATES PATENTS

| 3,254,203 | 5/1966 | Kveim | 235—152 |
| 3,320,409 | 5/1967 | Larrowe | 235—151 |

MALCOLM A. MORRISON, *Primary Examiner.*

V. SIBER, *Assistant Examiner.*